United States Patent
Li et al.

(10) Patent No.: US 11,003,892 B2
(45) Date of Patent: May 11, 2021

(54) LANDMARK-FREE FACE ATTRIBUTE PREDICTION

(71) Applicant: SAP SE, Walldorf (DE)

(72) Inventors: Jianshu Li, Singapore (SG); Sujoy Roy, Singapore (SG)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 16/185,825

(22) Filed: Nov. 9, 2018

(65) Prior Publication Data

US 2020/0151424 A1 May 14, 2020

(51) Int. Cl.
*G06K 9/00* (2006.01)
*G06K 9/62* (2006.01)

(52) U.S. Cl.
CPC ..... *G06K 9/00228* (2013.01); *G06K 9/00275* (2013.01); *G06K 9/00281* (2013.01); *G06K 9/629* (2013.01); *G06K 9/6228* (2013.01); *G06K 9/6251* (2013.01)

(58) Field of Classification Search
CPC . G06K 9/00221–0315; G06K 9/00275; G06K 9/00281; G06K 9/6228; G06K 9/6251; G06K 9/626
See application file for complete search history.

(56) References Cited

U.S. PATENT DOCUMENTS

| | | | | |
|---|---|---|---|---|
| 2012/0321140 A1* | 12/2012 | Xiong | ................. | G06K 9/00228 382/108 |
| 2017/0083751 A1* | 3/2017 | Tuzel | ................. | G06K 9/00302 |
| 2017/0083755 A1* | 3/2017 | Tang | ................. | G06K 9/00268 |
| 2017/0147868 A1* | 5/2017 | Sun | ................. | G06K 9/00288 |
| 2017/0213359 A1* | 7/2017 | Zhou | ................. | G06K 9/6277 |
| 2017/0278302 A1* | 9/2017 | Varanasi | ................. | G06T 7/33 |
| 2018/0075353 A1 | 3/2018 | Roy | | |
| 2020/0074243 A1* | 3/2020 | Gu | ................. | G06K 9/6267 |
| 2020/0151424 A1* | 5/2020 | Li | ................. | G06K 9/00275 |

OTHER PUBLICATIONS

Jianshu Li; Fang Zhao; Jiashi Feng; Sujoy Roy; Shuicheng Yan; Terence Sim; Landmark Free Face Attribute Prediction; IEEE Transactions on Image Processing (vol. 27, Issue: 9, Sep. 2018) (Year: 2018).*

* cited by examiner

*Primary Examiner* — Sean T Motsinger
(74) *Attorney, Agent, or Firm* — Fish & Richardson P.C.

(57) ABSTRACT

Implementations include receiving an input image including a face, processing the input image through a global transformation network to provide a set of global transformation parameters, applying the set of global transformation parameters to the input image to provide a globally transformed image, processing the globally transformed image through a global representation learning network to provide a set of global features, processing the set of global features through a part localization network to provide a set of part localization parameters, applying the set of part localization parameters to the globally transformed image to provide a locally transformed image, processing the locally transformed image through a part representation learning network to provide a set of local features, and outputting a label representing at least one attribute depicted in the input image based on fusing global feature(s) from the set of global features, and local feature(s) from the set of local features.

20 Claims, 4 Drawing Sheets

LANDMARK-FREE FACE ATTRIBUTE PREDICTION

BACKGROUND

Face attribute prediction is an important task in face analysis and has wide application in face identification, verification, retrieval, human-computer interaction, among other tasks. However, face attribute prediction is a difficult task due to various challenging factors. Example factors include, without limitation, cluttered background, diverse face poses, and large variance of the same attribute on different face images.

A Detection-Alignment-Recognition (DAR) pipeline is traditionally used to perform face attribute prediction. Within DAR, an off-the-shelf face detector is used to detect faces in images in the detection stage. In an alignment stage, a face landmark detector is applied to faces, followed by establishing correspondence between the detected landmarks and canonical locations, whose design requires domain expert input. Faces are aligned by transformations estimated from the correspondence. In a recognition stage, features are extracted from the aligned faces, and fed into a classifier to predict the face attributes.

Although widely used, the alignment stage in the DAR pipeline suffers from many issues. Alignment has heavy dependence on quality of the landmark detection results. Despite good performance on near frontal faces, traditional face landmark detectors cannot give satisfactory results on unconstrained faces with large pose angles, occlusion, and/or blurriness. The error in landmark localization diminishes the performance for attribute prediction. Even with accurate facial landmarks, one still needs to handcraft specific face alignment protocols (e.g., canonical locations, transformation methods), demanding dense domain expert knowledge. Some warping artifacts of mapping landmark locations to canonical positions are also inevitable in aligning the faces. Consequently, facial attribute prediction error grows as a combination of erroneous off-the-shelf landmark detection and handcrafted protocols. Further, the DAR alignment process is decoupled from the objective of predicting facial attributes. That is, the alignment process is not explicitly optimized for the objective of predicting facial attributes.

SUMMARY

Implementations of the present disclosure are directed to landmark-free face attribute prediction. More particularly, implementations of the present disclosure are directed to a lAndmark Free Face Attribute pRediction (AFFAIR) platform uses an end-to-end learning pipeline to jointly learn spatial transformations, and attribute localizations that optimize facial attribute prediction with no reliance on landmark annotations, or pre-trained landmark detectors.

In some implementations, actions include receiving an input image including at least one face, processing the input image through a global transformation network to provide a set of global transformation parameters, applying the set of global transformation parameters to the input image to provide a globally transformed image, processing the globally transformed image through a global representation learning network to provide a set of global features, processing the set of global features through a part localization network to provide a set of part localization parameters, applying the set of part localization parameters to the globally transformed image to provide a locally transformed image, processing the locally transformed image through a part representation learning network to provide a set of local features, and outputting a label representing at least one attribute depicted in the input image based on fusing at least one global feature from the set of global features, and at least one local feature from the set of local features. Other implementations of this aspect include corresponding systems, apparatus, and computer programs, configured to perform the actions of the methods, encoded on computer storage devices.

These and other implementations can each optionally include one or more of the following features: the set of global transformation parameters are tailored for the input image for attribute representation learning, and a transformation is provided based on the set of global transformation parameters that establishes a mapping between the input image and the globally transformed image; the global representation learning network maps the globally transformed image from raw pixel space to a feature space; the global transformation network, and the global representation learning network are trained together end-to-end to minimize an attribute predication loss; the set of part localization parameters are applied to position a focus window to a relevant part on the at least one face through learned scaling and translating transformations; the set of part localization parameters is specific to an attribute of a plurality of attributes; and multiple attributes of a plurality of attributes share the set of part localization parameters.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to landmark-free face attribute prediction. More particularly, implementations of the present disclosure are directed to a lAndmark Free Face Attribute pRediction (AFFAIR) platform that uses an end-to-end learning pipeline to jointly learn spatial transformations, and attribute localizations that optimize facial attribute prediction with no reliance on landmark annotations, or pre-trained landmark detectors. Implementations can include actions of receiving an input image including at least one face, processing the input image through a global transformation network to provide a set of global transformation parameters, applying the set of global transformation parameters to the input image to provide a globally transformed image, processing the globally transformed image through a global representation learning network to provide a set of global features, processing the set of global features through a part localization network to provide a set of part localization parameters, applying the set of part localization parameters to the globally transformed image to provide a locally transformed image, processing the locally transformed image through a part representation learning network to provide a set of local features, and outputting a label representing at least one attribute depicted in the input image based on fusing at least one global feature from the set of global features, and at least one local feature from the set of local features.

In general, and as described in further detail herein, implementations of the present disclosure provide a landmark-free face attribute (referred to herein as lAndmark Free Face AttrIbute pRediction (AFFAIR)) platform. Unlike traditional face attribute prediction methods that require facial landmark detection and face alignment, the AFFAIR platform of the present disclosure uses an end-to-end learning pipeline to jointly learn spatial transformations, and attribute localizations that optimize facial attribute prediction with no reliance on landmark annotations, or pre-trained landmark detectors. The AFFAIR platform of the present disclosure achieves this through: simultaneously learning global transformation, which effectively alleviates negative effect of global face variation for the following attribute prediction tailored for each face; locating the most relevant facial part for attribute prediction; and aggregating the global and local features for robust attribute prediction. Within the AFFAIR platform, a competitive learning strategy is developed that effectively enhances global transformation learning for better attribute prediction. As described in further detail herein, the AFFAIR platform simultaneously learns the face-level transformation and attribute-level localization within a unified framework.

Figure 1:
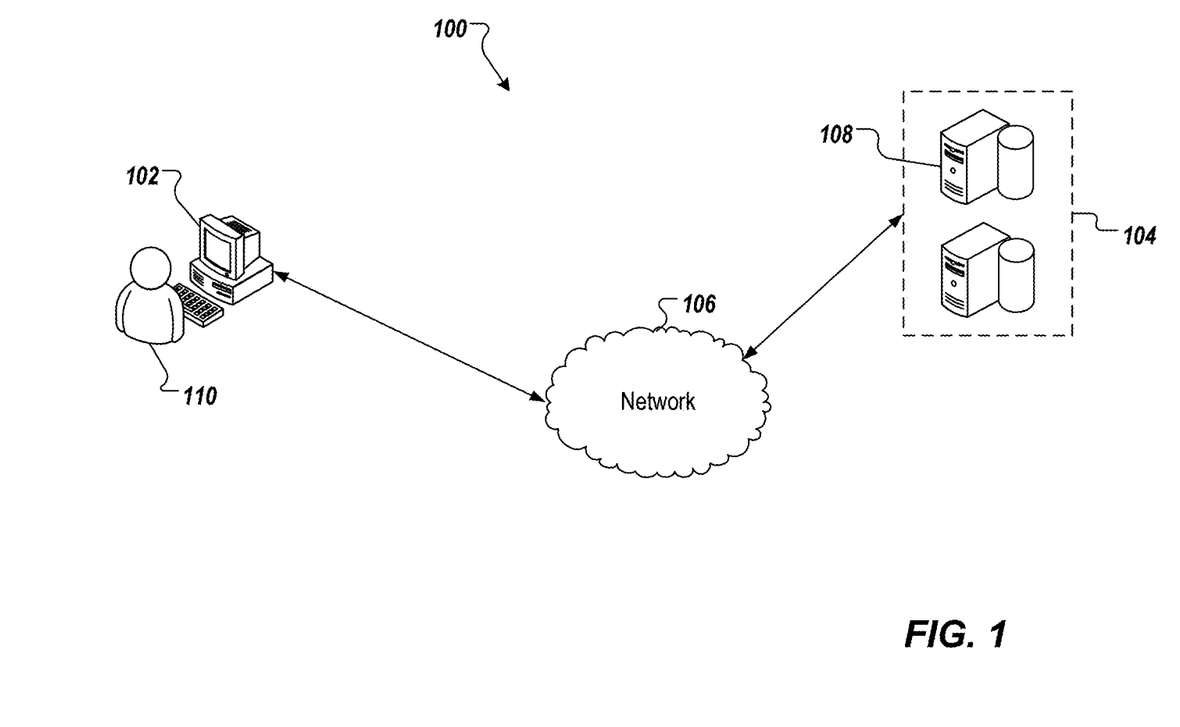
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104, and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In some implementations, the server system 104 can host an AFFAIR platform in accordance with implementations of the present disclosure (e.g., provided as one or more computer-executable programs executed by one or more computing devices). For example, input data (e.g., images, video) can be provided to the server system (e.g., from the client device 102), and the server system can process the input data through the AFFAIR platform to provide result data. For example, the server system 104 can send the result data to the client device 102 over the network 106 for display to the user 110.

As introduced above, implementations of the present disclosure are directed to an AFFAIR platform for landmark-free face attribute prediction. In some implementations, images of faces (e.g., human faces) are processed, and a global transformation and part localizations are learned on each input face end-to-end. In this manner, reliance on landmarks, and hard-wired face alignment is obviated. Implementations of the present disclosure are landmark free, and transformations and localizations optimized for each input face are learned. The learned global transformation transforms the input face to an optimized configuration for further representation learning and attribute prediction. Such global transformation of the face learned by the AFFAIR platform is implicitly pose adaptive. That is, any yaw, pitch, and rotation angles impact the learned transformations. In this manner, the AFFAIR platform learns a transformation for each input face image directly towards improved attribute prediction.

In some implementations, and as described in further detial herien, after learninng the global transformation, the AFFAIR platform of the present disclosure learns an adaptive part localization to localize and transform the most discriminative local part for predicting a specific attribute on the face. With more attention to the most relevant part, the AFFAIR platform focuses only on the local region, and learns more discriminative representation for better attribute prediction. Similar to the global transformation, the part localization is also obtained with an end-to-end learning based approach.

In accordance with implementations of the present disclosure, the AFFAIR platform builds a unified transformation-localization architecture to learn the global transformation and part localization, which is end-to-end trainable. The AFFAIR platform learns face-level representation from the globally transformed face image, and attribute-level representation from the localized face regions, both of which are used to make the attribute prediction. This global-local hierarchically transformation architecture, which learns global and local representation simultaneously, enables the AFFAIR platform of the present disclosure to provide improvements over traditional approaches that include Spatial Transformer Networks (STNs), and attention-based models.

In some implementations, to tackle large face variations in the wild (i.e., without landmarks), the AFFAIR platform implements a competitive learning strategy, which enables improved learning of the global transformation. In some implementations, multiple competitors are included in the training. In some examples, a first competitor learns representation from raw face images using a convolution neural network (CNN) (e.g., a vanilla CNN). In some examples, a second competitor learns from globally transformed faces. The second competitor with global transformation is chosen over the first competitor with the CNN as the training objective. Consequently, the competitive learning strategy enforces the learned global transformation to be beneficial for attribute prediction.

As described in further detail herein, implementations of the present disclosure provide an end-to-end learning framework for finding the appropriate transformation that optimizes the final objective of facial attribute prediction without requiring face landmark information, or pre-trained landmark detectorss. This stands in contrast to existing DAR pipelines, in which facial alignment and attribute prediction are separated. Further, the transformation-localization architecture of the present disclosure adaptively transforms any face with deviation from a normal face, and locates the most discriminative facial part for attribute prediction. Implementations of the present disclosure also provide a competitive learning strategy to effectively augment the learning of good global transformation tailored for each face without requiring extra supervision information.

Figure 2:
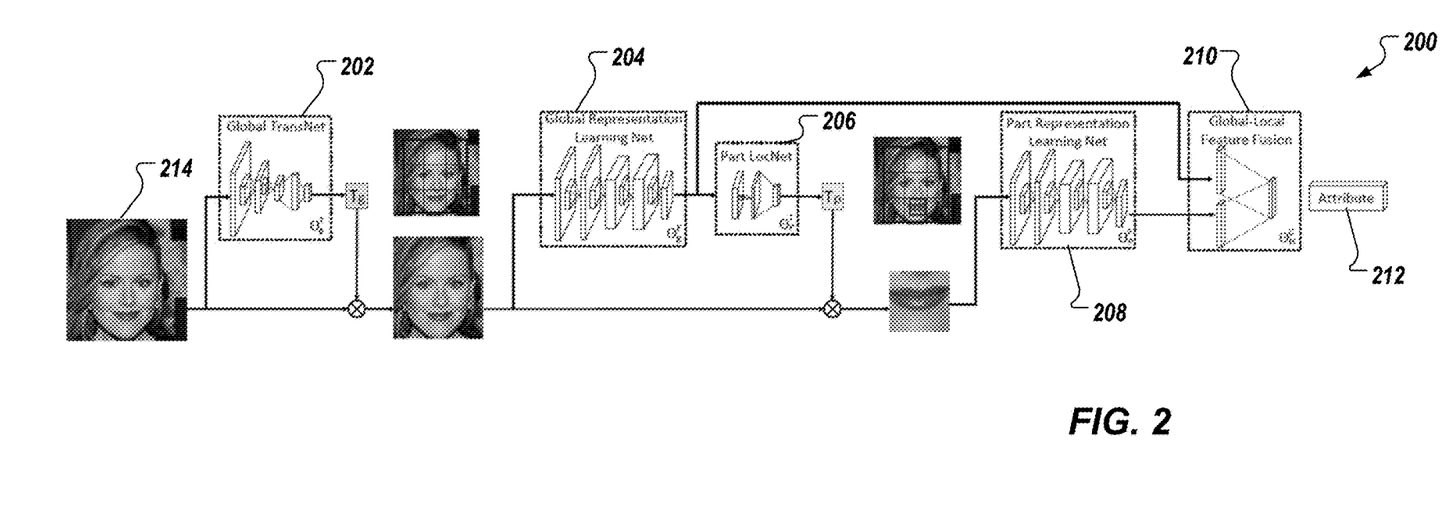
FIG. 2 depicts a conceptual architecture of a lAndmark Free Face AttrIbute pRediction (AFFAIR) platform in accordance with implementations of the present disclosure.

FIG. 2 depicts a conceptual architecture 200 of an AFFAIR platform in accordance with implementations of the present disclosure. The example architecture 200 includes a global transformation network (TransNet) 202, a global representation learning net 204, a part localization network (LocNet) 206, a part representation learning net 208, and a global-local feature fusion 210 that outputs an attribute 212 that is identified from an input image 214. In some examples, the global TransNet 202 learns a global transformation, and the part LocNet 206 learns part localizations. Through the hierarchical transformations, both the global face representation and the facial part representation are learned together for the purpose of face attribute prediction.

In some implementations, each of the global TransNet 202, the global representation learning net 204, the part LocNet 206, and the part representation learning net 208 is provided as one or more neural networks. In some examples, the global TransNet 202 is provided as a neural network including two convolutional layers, and two fully connected layers. In some examples, the global representation learning net 204 is provided as a convolutional neural network (CNN) including multiple layers with residual connections. For example, the global representation learning net 204 can be provided as ResNet-18. In some examples, the part LocNet 206 is a neural network with fully connected layers. In some examples, the part representation learning net 208 is provided as ResNet-18.

With regard to global transformation learning, the global TransNet 202 of the AFFAIR platform takes the detected face as input (e.g., an image is pre-processed for facial detection, and a detected face is provided as the input image 214), and produces a set of optimized transformation parameters tailored for the original input face for attribute representation learning. The set of the parameters for global transformation is denoted as $T_g$. The transformation establishes the mapping between the globally transformed face image and the input image 214. For example:

$$\begin{pmatrix} x_i^{input} \\ y_i^{input} \end{pmatrix} = T_g \begin{pmatrix} x_i^g \\ y_i^g \\ 1 \end{pmatrix} \quad (1)$$

Using the learned transformation parameters $T_g$, the globally transformed face images are obtained pixel-by-pixel. The pixel value at location $(x_i^g, y_i^g)$ of the transformed image is obtained by bilinearly interpolating the pixel values on the input face image centered at $(x_i^{input}, y_i^{input})$. No constraints are imposed on the parameters $T_g$, such as, without limitation, equal scaling on horizontal and vertical directions, rotation only, and the like. This gives full flexibility to the AFFAIR platform to discover a transformation that is beneficial for predicting attributes for the specific input face. Parametrized by $\theta_g^T$, the global TransNet 202 learns the proper transformation $T_g$ on an input face I, where $T_g = f_{\theta_g^T}(I)$. Here, the superscript T of $(\cdot)^T$ denotes "transformation T," instead of matrix transpose as conventionally used. The gradient is back propagated in the global representation learning net to the global TransNet 202 with the learning strategy in STN. In this manner, the global TransNet 202 and the global feature representation learning net 204 are trained end-to-end for attribute prediction.

With regard to the global representation learning net 204, multiple face attributes usually have dependencies on each other. For example, the attribute "male" has strong dependency on the attribute "goatee," the attribute "straight hair" provides strong negative evidence for the attribute "wavy hair." Consequently, learning a shared face representation for multiple attribute prediction is better than learning separate face representations for each individual attribute. The global representation learning net 204 considers all of the facial attributes simultaneously. More explicitly, the output face from the global TransNet 202 can be denoted as $f_{\theta_g^T}(I)$. The global face representation learning net 204, parametrized by $\theta_g^F$, maps the transformed image from the raw pixel space to a feature space beneficial for predicting all of the facial attributes, denoted as $f_{\theta_g^F, \theta_g^T}(I)$. In some examples, a total of N attributes are to be predicted. Based on the common feature space, N independent classifiers, parametrized by $\theta^C_{g_i}$, are built for performing attribute-specific classification. The overall mapping from an input face image to the i-th attribute prediction can be denoted as $$f_{\theta^C_{g_i}, \theta_g^F, \theta_g^T}(I).$$

The global TransNet 202 and the global representation learning net 204 are trained together end-to-end to minimize the following attribute predication loss:

$$\mathcal{L}_{global} = \sum_{i=1}^{N} \mathcal{L}\left(f_{\theta_{g_i}^C, \theta_g^F, \theta_g^T}(I), L_i\right) + R(T_g) \quad (2)$$

where $L_i$ is the ground truth label for the i-th attribute for image I, and $\mathcal{L}(\cdot,\cdot)$ is the loss between the prediction of the classifier and the ground truth label, which can be realized by the cross-entropy loss or the Euclidean distance loss. $R(\cdot)$ is the regularization factor on the magnitude of the spatial transformation, which penalizes the situation where the transformation grids corresponding to $T_g$ fall outside the boundary of the input image.

More concretely, it can be provided that, under transformation $T_g$ in Equation (1), the corresponding $(x_i^{input}, y_i^{input})$ needs to be within $[-1,1]$ (as normalized by the width and height of the image), or otherwise a loss is caused: $R(T_g) = L_R(x_i^{input}) + L_R(Y_i^{input})$ for all $(x_i^{input}, y_i^{input})$ corresponding to the points $(x_i^g, y_i^g)$ in the transformed image, where:

$$L_R(x) = \begin{cases} 0.5 \times (x-1)^2, & \forall x > 1 \\ 0.5 \times (x+1)^2, & \forall x < -1 \\ 0, & \text{otherwise} \end{cases} \quad (3)$$

The regularization ensures that the generated global transformation is valid and produces meaningful transformed images.

Through the end-to-end training described herein, the global TransNet 202 can learn to transform the faces to a face that is favorable for attribute prediction. However, faces captured in the wild (without landmarks) usually present large variations. Unlike objects having simple shapes whose optimal global transformations are easy to learn (e.g., digits, street signs), high-quality transformation of faces is much more difficult to learn. To this end, the global TransNet 202 finds a good scale, necessary rotation and translation to best transform the face for accurate attribute prediction.

Figure 3:
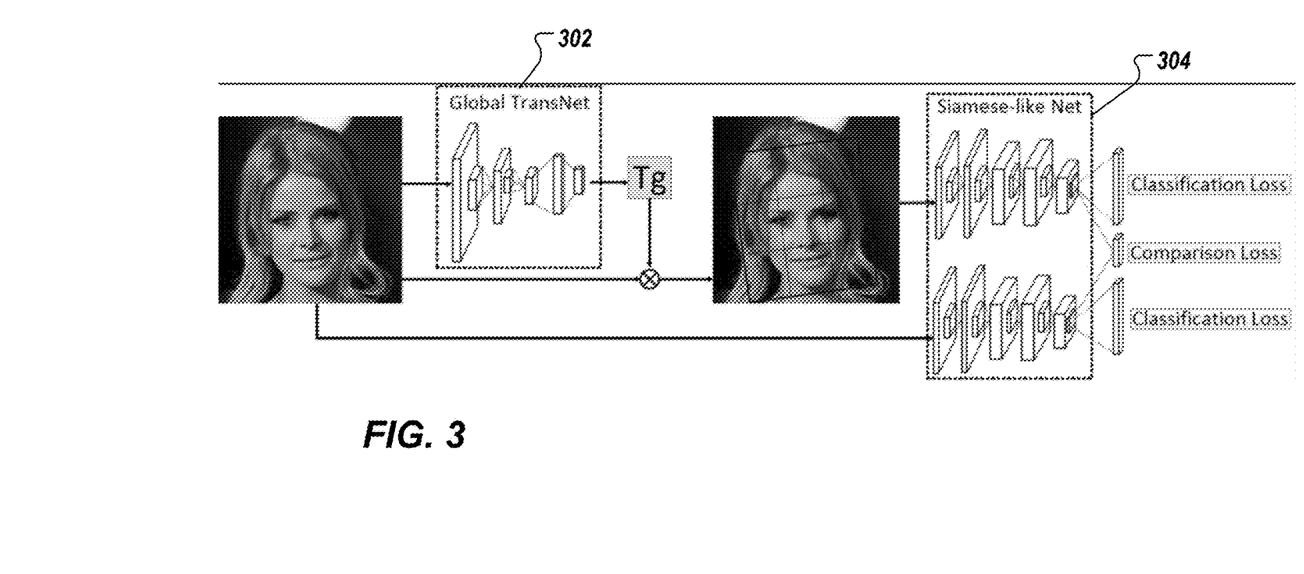
FIG. 3 depicts an example network with parallel branches used in a competitive learning strategy of the AFFAIR platform in accordance with implementations of the present disclosure.

To this end, implementations of the present disclosure provide the competitive learning strategy, introduced above, where the learning outcome of the transformed face is competing against the learning outcome of the original face image. FIG. 3 depicts an example network 300 with parallel branches used in a competitive learning strategy of the AFFAIR platform in accordance with implementations of the present disclosure.

As shown in FIG. 3, within the competitive learning strategy, the network 300 includes a Siamese-like network 304 provided after a global TransNet 302 to force the global TransNet 302 to learn the optimal global transformations. In further detail, an upper branch is connected with the globally transformed face image and the lower branch is connected with the original input face image. The global TransNet 302 takes as input the whole face image and learns to produce transformation parameters for the face image. The globally transformed face image is fed into the upper branch of the Siamese-like network 304 to perform attribute prediction. At the same time, the lower branch of the Siamese-like network 304 takes as input the original face image with no transformation. Both branches have the same architecture. Formally, we define the competitive learning loss, which includes two attribute prediction losses and a comparison loss, as:

$$\mathcal{L}_{com} = \alpha \sum_{i=1}^{N} \|\hat{f}_i(I) - L_i\|^2 + \beta \sum_{i=1}^{N} \|\hat{f}_u(I) - L_i\|^2 + \gamma \sum_{i=1}^{N} \max(\|\hat{f}_u(I) - L_i\|^2 - \|\hat{f}_l(I) - L_i\|^2 + \varepsilon, 0) \quad (4)$$

Here $$\hat{f}_u(\cdot) = f_{\theta_{g_i}^{C_u}, \theta_g^{F_u}, \theta_g^T}(\cdot)$$

is the mapping function of the upper branch (with global TransNet 302) and $$f_l(\cdot) = \hat{f}_{\theta_{g_i}^{C_l}, \theta_g^{F_l}}(\cdot)$$

is the mapping function from the lower branch (without global TransNet 302). The regularization on $T_g$ is omitted for simple notation. The third loss penalizes the case where the upper branch performs worse than the lower. It also includes a margin parameter $\varepsilon$. Within the total loss, $\alpha$, $\beta$ and $\gamma$ weigh loss terms in $\mathcal{L}_{com}$. When optimizing the loss, it is empirically found that the loss is going to take advantage of the upper branch and spoil the performance of the lower branch. Consequently, the lower branch is pre-trained, and its parameters are fixed. In some examples, $\mathcal{L}_{com}$ is optimized with $(\alpha, \beta, \gamma) = (1,0,0)$. $\theta_g^{F_i}$ and $\theta_{g_i}^{C_i}$ are fixed, and $\mathcal{L}_{com}$ is optimized with $(\alpha, \beta, \gamma) = (0,1,1)$ or $(0,0,1)$.

The above competitive learning strategy enforces the global TransNet to learn good transformation in the sense that it benefits the attribute prediction more than the one without transformation.

Part information is also critical for attribute prediction. Most attributes (e.g., the shape of the eyebrow, the appearance of a goatee) are only reflected by a small part of the face. Interference from other parts may harm the prediction performance for these attributes. In view of this, the AFFAIR platform of the present disclosure includes the part LocNet (e.g., the part LocNet 206 of FIG. 2) to localize the most relevant and discriminative part for a specific attribute and make attribute prediction. In this manner, negative interference from other irrelevant parts can be effectively reduced. The part LocNet is also end-to-end trainable. More specifically, with access to the whole face, the part LocNet predicts a set of localization parameters that positions the focus window to a relevant part on the face through learned scaling and translating transformations. Similar to the global transformation, the set of part localization parameters is denoted as $T_p$, and the correspondence between the part to the globally transformed face image is modeled by:

$$\begin{pmatrix} x_i^g \\ y_i^g \end{pmatrix} = T_p \begin{pmatrix} x_i^p \\ y_i^p \\ 1 \end{pmatrix}$$

which links the pixel value at location $(x_i^p, y_i^p)$ on the output partial face image to the pixel values centered at location $(x_i^g, y_i^g)$ on the globally transformed face image. Different from global transformation, the part localizations learned for different attributes are different. Therefore, for N attributes there are N part localization parameters $T_{p_i}$ to learn. After identifying the local region for a certain attribute, the AFFAIR platform resizes the region to a higher resolution, and performs attribute prediction on top of it. With the supervision of attributes in end-to-end training, the part LocNet is able to identify and locate the most discriminative region on the face, benefiting attribute prediction.

Within the AFFAIR platform, all of the part LocNets share the main trunk of networks (e.g., the convolution layers) with the global representation learning net (parametrized by $\theta_g^F$). The additional parameters to generate the transformation $T_{p_i}$ in the part LocNet for the i-th attribute are denoted by $\theta_{p_i}^T$. Consequently, $$T_{p_i} = f_{\theta_{p_i}^T, \theta_g^F, \theta_g^T}(I).$$

The face image is transformed by the part localization parameter $T_{p_i}$ according to Equation (5). The locally transformed face image is processed by the i-th part representation learning net parametrized by $\theta_{p_i}^F$, and the i-th part classifier with parameter $\theta_{p_i}^C$. The loss function to train the part component is provided as:

$$\mathcal{L}_{part} = \sum_{i=1}^{N} \mathcal{L}\left(f_{\theta_{p_i}^C, \theta_{p_i}^F, \theta_{p_i}^T, \theta_g^F, \theta_g^T}(I), L_i\right) + \qquad (6)$$

$$\sum_{i=1}^{N} R(T_{p_i}) + \sum_{i=1}^{N} \mathcal{L}\left(f_{\theta_{g_i}^C, \theta_g^F, \theta_g^T}(I), L_i\right) + R(T_g)$$

$$\mathcal{L}_{part} = \sum_{i=1}^{N} \left[\mathcal{L}\left(f_{\theta_{p_i}^C, \theta_{p_i}^F, \theta_{p_i}^T, \theta_g^F, \theta_g^T}(I), L_i\right) + R(T_{p_i})\right] + \qquad (7)$$

$$\sum_{i=1}^{N} \mathcal{L}\left(f_{\theta_{g_i}^C, \theta_g^F, \theta_g^T}(I), L_i\right) + R(T_g).$$

It can be noted that some attributes correspond to the same local regions (e.g., attribute "mouth open" and attribute "wearing lipstick" both correspond to the mouth region). To save computation power, different attributes correspond to the same local face regions may share the same part LocNet parameter $\theta_{p_i}^T$, and part feature extraction net parameter $\theta_{p_i}^F$.

In accordance with implementations of the present disclosure, the AFFAIR platform combines the global TransNet and the part LocNets to provide a good global transformation that rectifies the face scale, location and orientation, and that identifies the most discriminative part on the face for specific attribute prediction. The global and local information are arranged in a hierarchical manner to combine the power from both. The original input face image is fed into the global TransNet, and the globally transformed face is provided as input for the part LocNets. The global and local features are generated by the global representation learning net and the part representation learning net, respectively. The hierarchical features are fused for attribute prediction. Formally, the loss of the hierarchical transformable network is defined as $$\mathcal{L}_{hierarchy} = \sum_{i=1}^{N} \mathcal{L}\left(f_{\theta_{h_i}^C}\left(f_{\theta_{p_i}^F, \theta_{p_i}^T, \theta_g^F, \theta_g^T}(I) + f_{\theta_g^F, \theta_g^T}(I)\right), L_i\right) + \qquad (8)$$

$$\sum_{i=1}^{N} \mathcal{L}\left(f_{\theta_{p_i}^C, \theta_{p_i}^F, \theta_{p_i}^T, \theta_g^F, \theta_g^T}(I), L_i\right) + \sum_{i=1}^{N} \mathcal{L}\left(f_{\theta_{g_i}^C, \theta_g^F, \theta_g^T}(I), L_i\right).$$

$$\mathcal{L}_{hier} = \qquad (9)$$

$$\sum_{i=1}^{N} \mathcal{L}\left(f_{\theta_{h_i}^C}\left(f_{\theta_{p_i}^F, \theta_{p_i}^T, \theta_g^F, \theta_g^T}(I) + f_{\theta_g^F, \theta_g^T}(I)\right), L_i\right) + R(T_g) + \sum_{i=1}^{N} R(T_{p_i})$$

$$\mathcal{L}_{hier} = \sum_{i=1}^{N} \mathcal{L}\left[f_{\theta_{h_i}^C}\left(f_{\theta_{p_i}^F, \theta_{p_i}^T, \theta_g^F, \theta_g^T}(I) + f_{\theta_g^F, \theta_g^T}(I)\right), L_i\right] \qquad (10)$$

Here $$f_{\theta_{p_i}^F, \theta_{p_i}^T, \theta_g^F, \theta_g^T}(I) + f_{\theta_g^F, \theta_g^T}(I)$$

refers to feature level aggregation of the global features and the local features. The loss in Equation (10) is differentiable and can be optimized by stochastic gradient descent (SGD). In some implementations, the AFFAIR platform is trained using an incremental training strategy. For example, the competitive learning strategy is used to pre-train $\theta_g^T$, which is used as the initialization to train all of the parameters in Equation (7). The learned parameters are used as initialization for the learning of all of the parameters in Equation (10). After this initialization, the network of the AFFAIR platform is trained end-to-end.

There are multiple face attributes and they are not independent. The method described above treats each attribute as an independent label, and predicts the existence of the attributes in an independent fashion. To account for dependencies, implementations of the present disclosure model the attribute relation on top of the previous model.

In some implementations, a feature vector (e.g., the activation from the penultimate layer of a CNN) used for attribute prediction is denoted as I. Multiple labels $y=\{y_1, y_2, y_3, \ldots, y_N\}$ are provided, where N is the number of labels. For the independent cases, each label $y_i$ is to be predicted based on the feature vector I. The following probability is maximized for each attribute i:

$$P(y_i|I) \qquad (11)$$

Although I is shared, the dependence of the attribute labels is not explicitly modeled. The prediction of $y_i$ not only depends on I, but also depends on other labels $\{y_j\}$, $j \neq i$. Accordingly, the following probability is maximized for each attribute i:

$$P(y_i|I, y_1, y_2, \ldots, y_{i-1}, y_{i30\ 1}, \ldots, y_N) \qquad (12)$$

The dependence of $y_i$ on itself can be used to transform Equation (12) to $$P(y_i|I, y) \qquad (13)$$

The dependence of the labels on the feature and on each other are model by a recurrent network, which iteratively refines the dependence matrix.

The AFFAIR platform of the present disclosure has been evaluated on the large-scale CelebFaces Attributes (CelebA) dataset, the Labeled Faces in the Wild with Attributes (LFWA) dataset, and the Multi-Task Facial Landmark (MTFL) dataset. The CelebA dataset contains over 200K celebrity images, each with full annotations on 40 attributes like "pointy nose," "wavy hair," and "oval face." The LFWA dataset has 13,233 images with the same 40 attributes as in the CelebA dataset. The MTFL dataset contains about 13K faces in the wild images with annotations of 4 face attributes (e.g., "gender," "smiling," "wearing glasses," and "head pose." The face images cover large pose variations and cluttered background and are quite challenging from an attribute prediction point-of-view.

The AFFAIR platform was evaluated against state-of-the-art methods for facial attribute prediction including: Lnet+ Anet, MOON, Face images and Attributes to Attributes, Mid-Level Deep Representation, Multi-Task Representation Learning, and Off-the-Shelf CNN Features. These traditional methods are comprehensive, covering various types of methodologies, which use global features, or use both global and local features. At least some of these methods use landmarks for face alignment, while the AFFAIR platform of the present disclosure does not use any landmark information. The metric used for evaluation is the accuracy of the predicted attributes.

The evaluation revealed that the AFFAIR platform achieves state-of-the-art performance without any face landmark information or face alignment process, outperforming other methods that use face alignment as pre-processing. The AFFAIR platform achieves 91.45% accuracy on the CelebA dataset, and 86.13% on the LFWA dataset, outperforming the current state-of-the-art by 0.45% and 0.22%, respectively. This performance is achieved without an alignment process, through use of the global TransNet described herein. Further, when combining the global and the part information, the full AFFAIR platform achieves better performance than each of the global component, and the part component. Comparing the full AFFAIR platform with the global component, the attribute which benefits the most is "bushy eyebrow." On average, most of the small attributes benefit from the part LocNet, such as "bangs," "eye glasses," "goatee," "mouth open," "narrow eyes," "pointy nose," "sideburns," "wearing earring," and the like. This demonstrates that the AFFAIR platform of the present disclosure, which uses the global-local approach described herein, improve the overall accuracy of attribute prediction.

Figure 4:
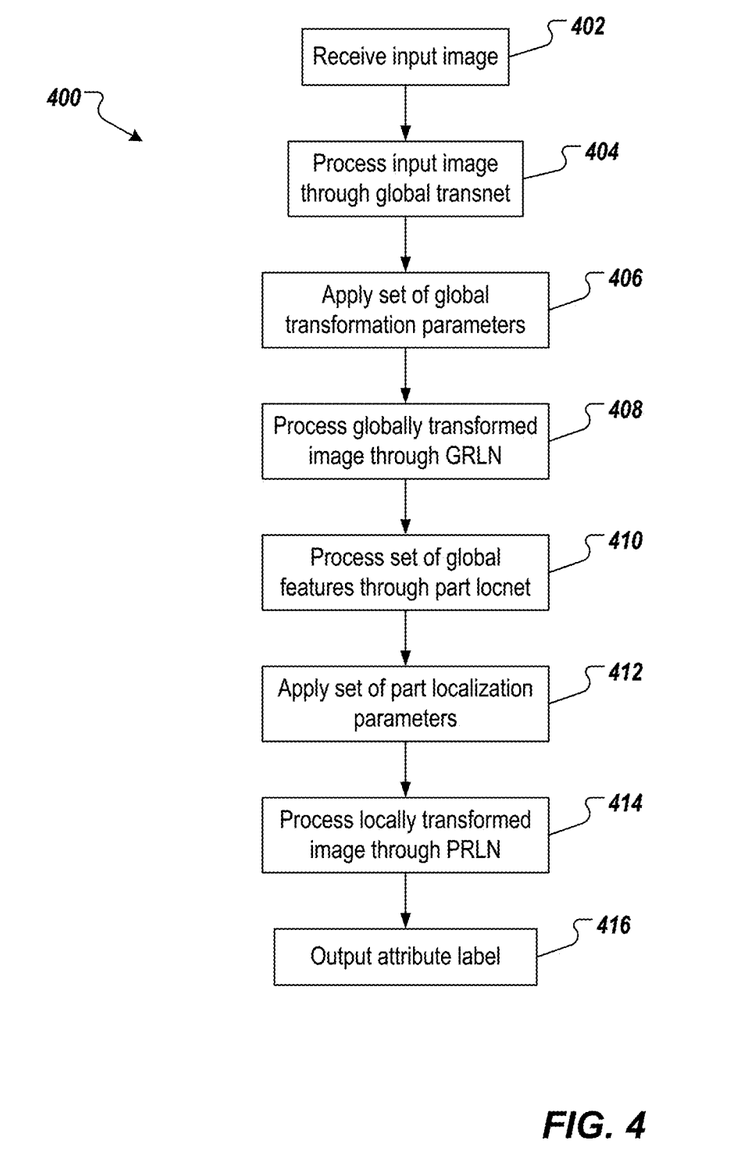
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices (e.g., the server system 104 of FIG. 1).

An input image including at least one face is received (402). For example, the AFFAIR platform of the present disclosure receives an input image depicting a human face. In some examples, the input image is provided from an initial image that was processed using facial detection, the input image being provided as a result of the facial detection. The input image is processed through a global transformation network to provide a set of global transformation parameters (404). For example, the global TransNet 202 of FIG. 2 processes the input image to provide the set of global transformation parameters ($T_g$).

The set of global transformation parameters is applied to the input image to provide a globally transformed image (406). For example, the set of global transformation parameters is applied to provide the globally transformed image ($f_{\theta^T_g}(I)$). The globally transformed image is processed through a global representation learning network (GRLN) to provide a set of global features (408). For example, the global representation learning network 204 of FIG. 2 processes the globally transformed image to provide the set of global features. The set of global features is processed through a part localization network to provide a set of part localization parameters (410). For example, the set of global features is processed by the part LocNet 206 to provide the set of part localization parameters ($T_p$).

The set of part localization parameters is applied to the globally transformed image to provide a locally transformed image (412). The locally transformed image is processed through a part representation learning network to provide a set of local features (414). A label representing at least one attribute depicted in the input image is output (416). For example, the attribute label 212 is provided as output.

Figure 5:
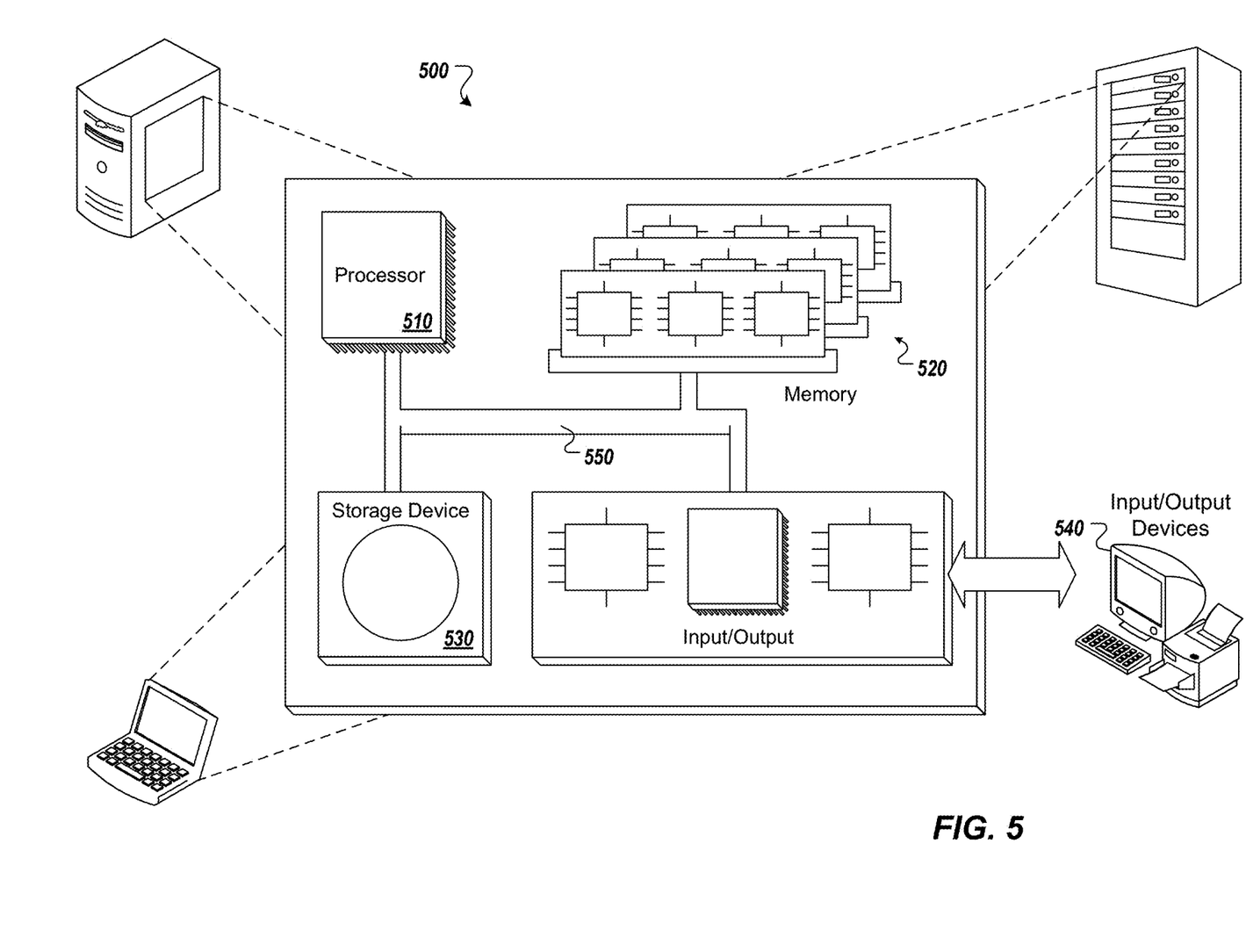
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for landmark-free facial attribute recognition in digital images, the method being executed by one or more processors and comprising:
   receiving an input image comprising at least one face;
   processing the input image through a global transformation network to provide a set of global transformation parameters;
   applying the set of global transformation parameters to the input image to provide a globally transformed image;
   processing the globally transformed image through a global representation learning network to provide a set of global features;
   processing the set of global features through a part localization network to provide a set of part localization parameters;
   applying the set of part localization parameters to the globally transformed image to provide a locally transformed image;
   processing the locally transformed image through a part representation learning network to provide a set of local features; and
   outputting a label representing at least one attribute depicted in the input image based on fusing at least one global feature from the set of global features, and at least one local feature from the set of local features.

2. The method of claim 1, wherein the set of global transformation parameters are tailored for the input image for attribute representation learning, and a transformation is provided based on the set of global transformation parameters that establishes a mapping between the input image and the globally transformed image.

3. The method of claim 1, wherein the global representation learning network maps the globally transformed image from raw pixel space to a feature space.

4. The method of claim 1, wherein the global transformation network, and the global representation learning network are trained together end-to-end to minimize an attribute predication loss.

5. The method of claim 1, wherein the set of part localization parameters are applied to position a focus window to a relevant part on the at least one face through learned scaling and translating transformations.

6. The method of claim 1, wherein the set of part localization parameters is specific to an attribute of a plurality of attributes.

7. The method of claim 1, wherein multiple attributes of a plurality of attributes share the set of part localization parameters.

8. A non-transitory computer-readable storage medium coupled to one or more processors and having instructions stored thereon which, when executed by the one or more processors, cause the one or more processors to perform operations for landmark-free facial attribute recognition in digital images, the operations comprising:
   receiving an input image comprising at least one face;
   processing the input image through a global transformation network to provide a set of global transformation parameters;
   applying the set of global transformation parameters to the input image to provide a globally transformed image;
   processing the globally transformed image through a global representation learning network to provide a set of global features;
   processing the set of global features through a part localization network to provide a set of part localization parameters;
   applying the set of part localization parameters to the globally transformed image to provide a locally transformed image;
   processing the locally transformed image through a part representation learning network to provide a set of local features; and
   outputting a label representing at least one attribute depicted in the input image based on fusing at least one global feature from the set of global features, and at least one local feature from the set of local features.

9. The computer-readable storage medium of claim 8, wherein the set of global transformation parameters are tailored for the input image for attribute representation learning, and a transformation is provided based on the set of global transformation parameters that establishes a mapping between the input image and the globally transformed image.

10. The computer-readable storage medium of claim 8, wherein the global representation learning network maps the globally transformed image from raw pixel space to a feature space.

11. The computer-readable storage medium of claim 8, wherein the global transformation network, and the global representation learning network are trained together end-to-end to minimize an attribute predication loss.

12. The computer-readable storage medium of claim 8, wherein the set of part localization parameters are applied to position a focus window to a relevant part on the at least one face through learned scaling and translating transformations.

13. The computer-readable storage medium of claim 8, wherein the set of part localization parameters is specific to an attribute of a plurality of attributes.

14. The computer-readable storage medium of claim 8, wherein multiple attributes of a plurality of attributes share the set of part localization parameters.

15. A system, comprising:
a computing device; and
a computer-readable storage device coupled to the computing device and having instructions stored thereon which, when executed by the computing device, cause the computing device to perform operations for landmark-free facial attribute recognition in digital images, the operations comprising:
processing the input image through a global transformation network to provide a set of global transformation parameters;
applying the set of global transformation parameters to the input image to provide a globally transformed image;
processing the globally transformed image through a global representation learning network to provide a set of global features;
processing the set of global features through a part localization network to provide a set of part localization parameters;
applying the set of part localization parameters to the globally transformed image to provide a locally transformed image;
processing the locally transformed image through a part representation learning network to provide a set of local features; and
outputting a label representing at least one attribute depicted in the input image based on fusing at least one global feature from the set of global features, and at least one local feature from the set of local features.

16. The system of claim 15, wherein the set of global transformation parameters are tailored for the input image for attribute representation learning, and a transformation is provided based on the set of global transformation parameters that establishes a mapping between the input image and the globally transformed image.

17. The system of claim 15, wherein the global representation learning network maps the globally transformed image from raw pixel space to a feature space.

18. The system of claim 15, wherein the global transformation network, and the global representation learning network are trained together end-to-end to minimize an attribute predication loss.

19. The system of claim 15, wherein the set of part localization parameters are applied to position a focus window to a relevant part on the at least one face through learned scaling and translating transformations.

20. The system of claim 15, wherein the set of part localization parameters is specific to an attribute of a plurality of attributes.

* * * * *